(12) United States Patent
Borouchaki et al.

(10) Patent No.: US 10,254,440 B2
(45) Date of Patent: Apr. 9, 2019

(54) PROCESS FOR CONSTRUCTING A VOLUME MESH FOR MODELING GEOLOGICAL STRUCTURES

(71) Applicant: IFP Energies nouvelles, Rueil-Malmaison (FR)

(72) Inventors: Houman Borouchaki, Paris (FR); Jean-Francois Lecomte, Rueil-Malmaison (FR); Jean-Marc Daniel, Chatou (FR); Christophe Delage, Nanterre (FR); Chakib Bennis, Rueil-Malmaison (FR)

(73) Assignee: IFP Energies nouvelles, Rueil-Malmaison (FR)

( * ) Notice: Subject to any disclaimer, the term of this patent is extended or adjusted under 35 U.S.C. 154(b) by 640 days.

(21) Appl. No.: 14/603,444

(22) Filed: Jan. 23, 2015

(65) Prior Publication Data

US 2015/0212231 A1   Jul. 30, 2015

(30) Foreign Application Priority Data

Jan. 28, 2014 (FR) ...................... 14 50670

(51) Int. Cl.
*G01V 11/00* (2006.01)
*G06T 17/20* (2006.01)
(Continued)

(52) U.S. Cl.
CPC .......... *G01V 11/00* (2013.01); *G01V 1/28* (2013.01); *G01V 99/005* (2013.01); *G06T 17/05* (2013.01); *G06T 17/20* (2013.01)

(58) Field of Classification Search
CPC ........ G01V 11/00; G01V 1/28; G01V 99/005; G06T 17/05; G06T 17/20
(Continued)

(56) References Cited

U.S. PATENT DOCUMENTS

| | | | | |
|---|---|---|---|---|
| 2011/0054857 | A1* | 3/2011 | Moguchaya | G01V 99/00 703/2 |
| 2012/0026167 | A1* | 2/2012 | Ran | G06T 17/205 345/420 |
| 2012/0215513 | A1* | 8/2012 | Branets | G01V 99/00 703/10 |

OTHER PUBLICATIONS

Jigang Li et. al., A Efficient and Robust Method for Complexly faulted Horizon Reconstruction Based on Meshes Cutting and Interpolating, 978-1-4673-0089-6/12/, 2012 IEEE.*

(Continued)

*Primary Examiner* — Aniss Chad
*Assistant Examiner* — Justin C Mikowski
(74) *Attorney, Agent, or Firm* — Fitch, Even, Tabin & Flannery LLP

(57) ABSTRACT

Process for constructing a volume mesh of a subsurface formation comprising at least one sedimentary layer traversed by at least one fault.
On the basis of a representation in a closed domain of the geometry of the horizons and of the faults in a parametric space before deformation and rupture, the bounds of the blocks delimited by the faults, the horizons and the boundaries of the domain are projected onto a reference surface. Next a surface mesh is constructed constrained by the projections thus obtained on the reference surface. At each node of the surface mesh, a vertical polygonal line passing through this node is defined. Next a volume mesh is constructed by vertical extrusion of the surface mesh along the polygonal lines.
Application in particular to exploration and to exploitation of oilfields.

12 Claims, 6 Drawing Sheets

(51) Int. Cl.
  *G06T 17/05* (2011.01)
  *G01V 99/00* (2009.01)
  *G01V 1/28* (2006.01)

(58) Field of Classification Search
  USPC .......................................................... 703/10
  See application file for complete search history.

(56) References Cited

OTHER PUBLICATIONS

Jigang Li et. al., Volume construction from surface model base on spatial topology, 978-1-4244-8728-8/11/, 2011 IEEE.*
E. Gringarten et al., Advantages of Using Vertical Stair Step Faults in Reservoir Grids for Flow Simulation, SPE 119188, Feb. 2009.
Jean-Laurent Mallet, Space-Time Mathematical Framework for Sedimentary Geology, Mathematical Geology, Jan. 2004, pp. 1-32, vol. 36, No. 1.
Jim Thom et al., 3-D Grid Types in Geomodeling and Simulation—Howe the Choice of the Model Container Determines Modeling Results, Search and Discovery Article #40477, Dec. 2009.

* cited by examiner

PROCESS FOR CONSTRUCTING A VOLUME MESH FOR MODELING GEOLOGICAL STRUCTURES

BACKGROUND OF THE INVENTION

Field of the Invention

The present invention relates to the oil exploration and more particularly to exploration and exploitation of oil reservoirs or geological gas storage sites.

Description of the Prior Art

The study of an oil field requires the construction of a representation of the subsurface formation under study, also called a geological model in a broad sense a geomodel. These models, which are well known and are widely used in the oil industry, make possible determination of numerous technical parameters relating to the search for, study or exploitation of a reservoir, of hydrocarbons for example. Thus, a geological model must be representative of the structure of a reservoir as well as its behavior. This type of mockup of the subsoil is usually represented on a computer, by a mesh or grid, which is generally three-dimensional. Each mesh cell is characterized by one or more petrophysical properties such as facies, porosity, permeability, saturation, etc.

Today, oil exploration is concerned with zones with complex geometry, where faults are numerous and their positions random. Thus, even before the phase of filling in with petrophysical properties, the construction of a 3D mesh in such a context must account as faithfully as possible for the geometry of the horizons which delimit the various geological layers, and the faults which intersect the horizons. The horizons and the faults generally originate from an interpretation of a seismic image and are usually provided in the form of scatterplots.

The resulting mesh can thereafter be used to carry out numerical simulations such as basin modeling, reservoir simulation and/or the simulation of CO2 injection, simulations for improving the understanding of an oil field or of a geological gas storage site.

The goal of basin modeling is to reconstruct the geological history of a sedimentary basin and of oil systems so as to help locate hydrocarbon traps, that is reservoirs, to estimate their quantity and quality, and finally, to evaluate the risks of encountering pressure excesses during drilling. Reservoir simulation studies the evolution over time of the proportions of water, gas and oil in the reservoir in order to assess profitability and to validate or to optimize the position of the wells ensuring the operation of the exploitation of the reservoir. In an epoch where lasting development and protection of the environment are becoming paramount, a third study related to oil exploration performs simulations with respect to the injection of CO2 into a porous subsurface medium.

Basin modeling, reservoir simulation and CO2 simulation are techniques based on the simulation of flow in a porous medium. A flow simulator is a software making possible, inter alia, modelling of the production of an oilfield as a function of time, on the basis of measurements describing the oilfield, based on a representation of the subsurface medium. These simulations are carried out by a system of partial differential equations by finite volume methods on a meshed model of the subsurface medium under study.

Basin modeling also carries out mechanical calculations using finite element methods, in particular to calculate the geomechanical deformation of the basin over time.

The flow simulators currently used in industry require that the volume mesh representing the subsurface formation being studied are hexa-dominant, that is to say characterized by as many hexahedral elements as possible. It is moreover desirable that the edges of the volume elements be oriented perpendicular to the stratigraphy, which is made possible by hexa-dominant meshing. Moreover, a hexahedral representation makes it possible to taking natural account of an anisotropy of a vertical type. Basin modeling has, in addition, inherent constraints which are the mesh cells must generally be convex, the mathematical representation of the horizons must allow correct representation of the time evolution of sedimentation and compaction of sedimentary layers, and the representation of the faults must allow correct simulation of slippage along the fault planes.

DESCRIPTION OF THE PRIOR ART

The following documents will be cited in the course of the description:

Borouchaki, H., 2001, Génération de Maillages de Qualité: la Marche Unité, Traité en Mécanique et Ingénierie des Matériaux, Méthodes Numériques, Maillage et Adaptation, Under the Direction of Paul-Louis George, Chapter 4, pp. 139-171, Hermès, Paris, France.

Frey, P., and George, P. L., 2008, Mesh Generation, Application to Finite Elements, Wiley.

Gringarten, E Haouesse, A. Arpat B, Nghiem L, 2009, Advantage of Using Vertical Stair Step Faults in Reservoir Grids for Flow Simulation, SPE 119188, Society of Petroleum Engineers.

George, P. L. and Borouchaki, H., 1998, Delaunay Triangulation and Meshing. *Applications to Finite Elements, Hermes, Paris, France.*

Mallet, J-L., 2004, Space-Time Mathematical Framework for Sedimentary Geology. *Journal of Mathematical Geology,* 36, 1-32.

Thom, J and Höcker, C, 2009, 3-D Grid Types in Geomodeling and Simulation—How the Choice of the Model Container Determines Modeling Results, Search and Discovery Article #40477.

The simplest form of representation of a geological model is a regular grid (for which the distance between the nodes of the grid is invariant along one and the same direction in space) and is structured so that the connection between the nodes of the grid obeys a simple mathematical law. This type of grid is particularly easy to manipulate since it is not necessary to store either the geometry of the grid (indicating where the nodes of the grid are placed with respect to one another) or its topology (indicating how the nodes of the grid are inter-linked). Only a three-dimensional table containing the physical property of interest (amplitude, porosity, etc.) is stored. These grids exhibit a significant advantage with respect to basin simulation. They allow correct representation of sedimentation or compaction of sedimentary layers. On the other hand, this type of grid does not allow correct accounting for the geometry of the horizons and faults such as may be observed in reality, in particular in the case of structurally complex zones.

To address this need for a realistic representation of the geometry of the horizons and faults, recourse may be had to destructured meshes, composed of an explicit representation of the topology and of simple elements, such as for example tetrahedrons used in the finite element method, certain faces of which will correspond to faults or to horizons. However, a reliable representation of faults and horizons by this type of meshing requires a very significant number of mesh cells. Moreover, this type of representation does not allow anisotropy to be represented correctly. What is more significant, is the finite volume calculations, such as those involved in flow simulation, poorly support tetrahedral representation. Finally, destructured meshes make it necessary to store the geometry of the mesh, and also require a powerful topological engine. As regards more particularly basin simulation calculations, this type of mesh does not have a favored edge direction perpendicular to the stratigraphy which greatly complicates the correct representation of sedimentation and of compaction.

The first basin simulators introduced some flexibility by resorting to semi-regular grids, also termed "Vertical pillar grids". For this type of representation, the grid is regular in the x and y directions in space, but is irregular vertically. The basic element of this type of mesh is a hexahedron. This structured type of mesh requires only storage of the various positions of the nodes of the grid in the vertical direction in order to reconstruct the complete geometry of the grid. Moreover, by making it possible to follow the topography of each horizon, this type of mesh is perfectly suitable for representing the time evolution of the sedimentary layers in basins. The main defect of this type of representation is that it is very difficult to represent complex networks of faults. The presence of faults is then simulated at their intersections with the grid for example by arbitrary variations of thickness or else by an average value of the petrophysical property being studied. In particular, this representation of faults does not make it possible to simulate slippage along faults. Moreover, the choice of the value to be ascribed is often difficult.

Regarding more particularly reservoir simulation, an exact way of working is cutting a vertical pillar grid with faults, such as for grids of "Faulted S-Grid" type (for example Thom and Hocke, 2009). However, the cutting of a hexahedron by a network of faults represented by arbitrary surfaces may create very complex polyhedrons or to tetrahedral sub-meshes that are not very well suited for finite volume calculations. An alternative is introducing pillars guided by the faults. Unfortunately, this type of grid, so-called a "Pillar Grid" type, does not allow the correct representation of very complex networks of faults. Indeed, the parallelism of the pillars at the level of the faults introduces constraints which are difficult to comply with and do not make it possible to obtain geometrically correct grids in all cases.

Today, the grids most widely employed for reservoir simulation are grids of the so-called "S-Grid" type (Gringarten et al. 2009). These are structured grids in which faults are represented in the form of staircase-shaped discontinuities.

This type of grid makes possible modelling of very complex networks of faults, while correctly representing the sedimentary layers. Moreover, when dealing with a structured mesh, the topology is implicitly known, except along the faults where the links between mesh cells must be described explicitly, face by face. On the other hand, this representation is inappropriate for basin simulators, for which it is necessary to be able to simulate slippages along the fault planes over time.

Thus, none of the prior art meshes is perfectly suitable both for basin simulation and reservoir simulation.

SUMMARY OF THE INVENTION

The present invention is a process for constructing a volume mesh of a subsurface formation making possible in particular reconciliation the constraints of the basin simulation and also those of reservoir simulation, even when a subsurface formation has complex geometry.

Thus, the present invention relates to a process for constructing a volume mesh of a subsurface formation comprising at least one sedimentary layer, limited vertically by two geological horizons and traversed by at least one fault, based on a representation in a closed domain of the geometry of the horizons and of the fault in a parametric space before deformation and rupture. The process comprises the following steps:

a) projecting the bounds of at least one block in the closed domain onto a reference surface, the blocks being limited by the representation of the faults, of the horizons and boundaries of the closed domain;

b) constructing a surface mesh constrained by the projections on the reference surface;

c) defining a vertical polygonal line at each node of the surface mesh;

d) constructing by vertical extrusion a volume mesh of the surface mesh along the polygonal lines.

According to a preferred mode of implementation of the invention, the reference surface may be a horizontal plane in the parametric space.

According to another preferred mode of implementation of the invention, the parametric space may be the Wheeler parametric space.

Preferably, the reference surface can be the surface located at the ordinate t=0 in the Wheeler parametric space.

According to the invention, it is possible to transpose the volume mesh into the geological space via a transformation method linking the Wheeler parametric space and the geological space.

According to the invention, it is possible to apply a node relocation technique to the volume mesh. According to the invention, the surface mesh can be of a quad-dominant type. The surface mesh can then be obtained according to the steps:

generating a triangular mesh constrained by the projections on the reference surface; and using pairs of adjacent triangles to form quadrilaterals.

Moreover, the triangular mesh can be obtained according to an advancing front method.

According to the invention, the vertical polygonal line of a node of the surface mesh can be at least one vertical segment limited by the intersections of the vertical line passing through the node with the representations of the horizons or of the fault. According to the invention, the vertical extrusion of a surface element can be carried out in the following manner:

traversing simultaneously, segments, and polygonal lines associated with the surface element;

it is possible to laterally linking ends of the polygonal lines of the same level and to vertically link the ends of the polygonal lines of consecutive levels;

for each volume element which is formed, if some nodes of one and the same level do not belong to a same fault or to same horizon, cutting the volume element according to at least one transverse plane passing through the two consecutive levels.

Advantageously, it is possible to implement a step of matching of the curves and points resulting from the projection of the block bounds carried out between steps a) and b), by merging of at least one of curves and the points having a separation less than a predetermined threshold, and/or of addition of points at a level of the intersections between a plurality of the curves.

Furthermore, the invention relates to a computer program product downloadable from a communication network and/or recorded on a non transient support readable by computer and/or executable by a processor, comprising program code instructions for the implementation of the process according to the description hereinabove, when the program is executed on a computer.

It is possible to define a process for exploiting a subsurface formation by carrying out the following steps:
- a volume mesh representative of the formation is constructed by use of the process for constructing a volume mesh according to the invention;
- a basin simulation and/or a reservoir simulation is carried out on based on the volume mesh;
- determining an optimal scheme for exploiting the reservoir based on results of a basin simulation and/or of a reservoir simulation; and
- exploiting reservoir by implementing the optimal exploitation scheme.

BRIEF DESCRIPTION OF THE DRAWINGS

Other characteristics and advantages of the process according to the invention will become apparent on reading the description hereinafter of nonlimiting examples of embodiments, while referring to the appended figures described hereinafter.

DETAILED DESCRIPTION OF THE METHOD OF THE INVENTION

Figure 1A:
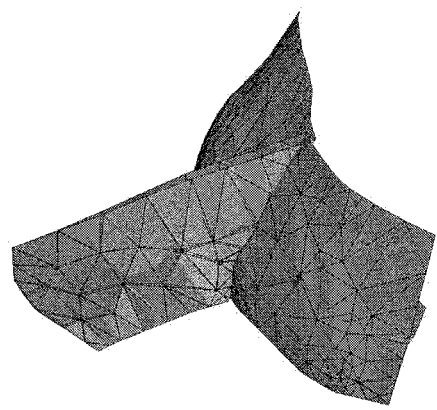
FIGS. 1A and 1B illustrate faults of two geological models, denoted Mod1 and Mod2.

The following definitions are used in the course of the description of the invention:

geological space: This is the three-dimensional euclidian space in which the sedimentary layers constituting a subsurface formation are represented such as are currently observable. This is to say after the sedimentary layers as deposited over time have undergone tectonic episodes causing the currently observable deformations and/or ruptures. Any point situated in the geological space is characterized by its coordinates (x,y,z), where the coordinates (x,y) correspond to the geographical coordinates of the point under consideration and z corresponds to the altitude or else to the depth with respect to the terrestrial surface of the point under consideration. This space is also known as "geographical space".

parametric space before deformation and rupture: This is a three-dimensional parametric space in which a subsurface formation is represented before deformation and rupture. More precisely, in this space, the sedimentary layers constituting a subsurface formation are represented in the hypothetical geometry of their deposition. Sedimentation is assumed to have occurred on a plane and horizontal surface. Thus, a geological model expressed in a parametric space before deformation and rupture corresponds to a stack of plane and horizontal sedimentary layers. Moreover, in this space, the faults have zero throw (offset induced by the fault). Moreover, any vertical line in a parametric space before deformation and rupture corresponds to a line locally perpendicular to the stratigraphy in the geological space.

Wheeler parametric space: The Wheeler parametric space is a particular parametric space before deformation and rupture. More precisely, it is a three-dimensional parametric space in which any point is characterized by its coordinates (u,v,t), where t corresponds to the geological time of the deposition of the point considered, and the coordinates (u,v) are space coordinates contained in a plane parallel to the horizons. Thus, the vertical axis of the Wheeler parametric space plots the age of the geological formation of a point of the geological space. A particular case of the coordinates (u,v) is the horizontal geographical coordinates (x,y). A particular solution of this space has been described in (Mallet, 2004). This type of representation is also known by the name "Geochron model", "representation in a paleo-geographical coordinate system", and in a general manner, "UVT representation". One also speaks of "UVT transformation" to describe the transformation which makes possible passing from the geological space to the Wheeler parametric space, and of "UVT$^{-1}$ transformation" which is the transformation making it possible passing from the Wheeler parametric space to the geological space. Such transformations, direct and inverse, can be carried out with the software SKUA® (PARADIGM®, Israel).

polygonal line: This is a geometric figure formed of a string of segments, with the second end of each one being the first end of the next one. This type of line is also known by the terminology "broken line".

vertical polygonal line: This is a polygonal line formed by a string of vertical segments, with the second end of each line being the first end of the next line, with all of the ends being situated on one and the same vertical line.

matched mesh: This is a mesh for which the intersection of any two elements is either empty or is a face of the mesh (vertex, edge, triangular or quadrilateral face).

valid mesh: This is a mesh all of whose elements have positive volume.

DETAILED DESCRIPTION OF THE INVENTION

The present invention is a process for representing a geological model of the subsoil as a volume mesh. The subsurface formation under study comprises at least one sedimentary layer traversed by at least one fault. A sedimentary layer is limited vertically by two geological horizons. The invention requires a mathematical representation in a closed domain of the horizons and of the faults of the formation under study in a parametric space before deformation and rupture. This signifies in particular that the representation of a horizon corresponds to a plane, horizontal and continuous surface extending through the faults. According to one mode of implementation of the invention, the mathematical representation of the horizons and faults is expressed in the Wheeler parametric space.

The present invention comprises at least the following steps:
a) projecting bounds of at least one block of a closed domain onto a reference surface, the blocks being limited by a representation of the faults, of the horizons and of boundaries of the closed domain;
b) constructing a surface mesh which is constrained by the projections onto the reference surface;
c) defining a vertical polygonal line at each node of the surface mesh; and
d) constructing a volume mesh by vertically extruding the surface mesh along the polygonal lines.

Figure 1B:
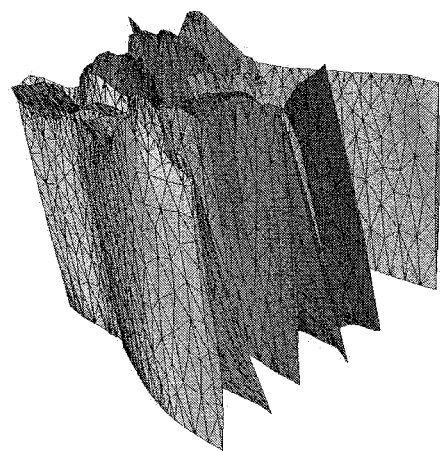

The main steps of the present invention are detailed hereinafter. They are illustrated on two geological models, called Mod1 and Mod2 hereinafter, which as well known in the art. Mod1 has five horizons and two faults intersecting almost at right angles (FIG. 1A). Mod2 has seven horizons and six faults which are almost parallel to one another (FIG. 1B). The mathematical representations of the horizons and of the faults of these models are expressed in a closed domain of the Wheeler parametric space.

Projection of the Curves Corresponding to the Bounds of Blocks onto a Reference Surface This first step entails projecting vertically, onto a reference surface, the curves corresponding to the bounds of at least one of the blocks formed by the horizons with the faults and the boundaries of the closed domain being defined in a parametric space before deformation and rupture.

According to a first embodiment of the invention, all of the bounds of blocks are projected onto a reference surface.

Therefore, the mathematical representation of each of the faults and of each of the horizons in the parametric space is used before deformation and rupture, and then curves are calculated corresponding to the intersections between each of these representations are taken in pairs and between each of these representations and the boundaries of the closed domain. All of these curves are thereafter projected vertically onto a reference surface.

For each projected curve obtained, the original information relating thereto is stored in memory, that is the geological object (fault, horizon or domain boundary) or the intersection of geological objects (intersection between two faults, between a fault and a horizon, between a fault and a domain boundary, between a horizon and a domain boundary) from which it arises.

According to a preferred embodiment of the invention, the reference surface is a horizontal plane in the parametric space before deformation and rupture. According to a second preferred embodiment of the invention, the mathematical representation of the horizons and of the faults defined in the Wheeler parametric space, the reference surface is defined by the horizontal plane situated at the ordinate t=0 of this space.

Figure 2A:
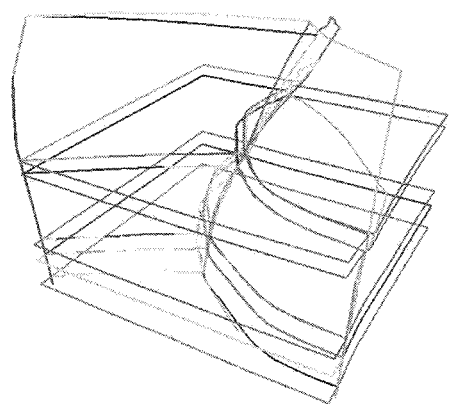
FIGS. 2A and 2B show bounds of blocks of the models Mod1 and Mod2.
Figure 2B:
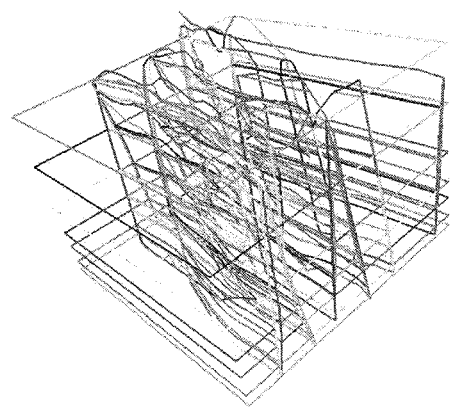
Figure 3A:
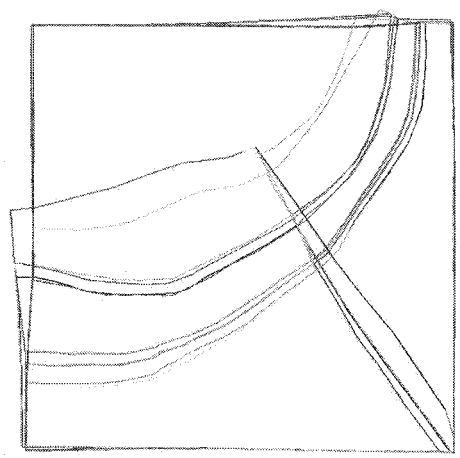
FIGS. 3A and 3B represent the projections of the bounds of blocks of the models Mod1 and Mod2 onto a reference surface situated at a time ordinate t=0 of the Wheeler parametric space.
Figure 3B:
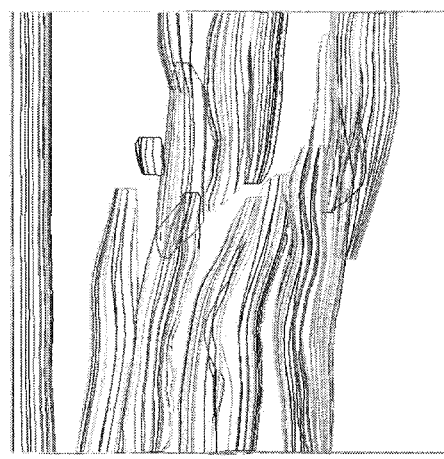

An illustration of this step is presented in FIGS. 2A-2B and 3A-3B. FIGS. 2A and 2B represent a 3D view of the bounds of the blocks constituting respectively the model Mod1 and the model Mod2 in the Wheeler parametric space. FIG. 3A and 3B represent the vertical projections on a reference plane situated at the ordinate t=0 of the Wheeler parametric space of the bounds of the blocks respectively of the model Mod1 and of the model Mod2.

Matching Up of the Projections of Block Bounds on a Reference Surface

According to one embodiment of the present invention, it is thereafter possible to process matching of the curves and points set resulting from the projection onto the reference surface of the bounds of blocks, as defined hereinabove. Thus, when the distance between two curves or two points obtained by projection on the reference surface is less than a predetermined threshold, the merging of these two curves or of these two points is undertaken. Moreover, when two curves cut one another on the reference surface, a point is added at the place of this intersection.

Care is also taken, during this step of matching, to preserve in memory the original information about each new curve and about each new point. Thus, for example, a curve resulting from the merging of two projected curves preserves the information about its two original curves (provenance and location). Likewise, a point added at the place of the intersection between two curves contains the information about its two original curves (provenance and location).

Construction of a Surface Mesh on the Reference Surface

In the course of this step, a surface mesh constrained by the vertical projections on the reference surface of the bounds of blocks is generated. For this surface meshing step, it is possible to define an expected maximum size for the individual surface elements.

According to an embodiment of the present invention, constructing a surface mesh of a quad-dominant type, having elements constituting the mesh are predominantly quadrilaterals. In this case, the construction of the mesh can comprise two consecutive steps. The first step generates a triangular mesh, for which an ideal element is a right-angled isosceles triangle. Therefore, according to an embodiment of the present invention, a combined technique is applied, based on the advancing front method for generating internal points (Borouchaki, 2001) and the generalized Delaunay method for connecting these points (George and Borouchaki, 1998). In a second step, pairs of adjacent triangles are paired up to form quadrilaterals.

Figure 4A:
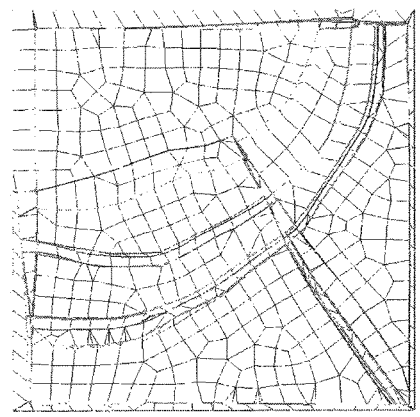
FIGS. 4A and 4B show a surface mesh of quad-dominant type produced for the models Mod1 and Mod2.
Figure 4B:
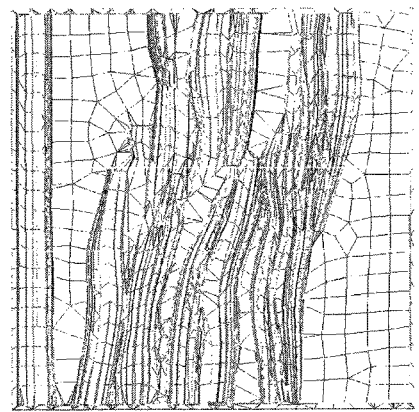

FIGS. 4A and 4B show the surface mesh of quad-dominant type constrained by the vertical projections onto the reference plane at t=0 of the bounds of blocks respectively of the model Mod1 and of the model Mod2. It may be noted that these surface meshes are formed mainly of quadrilaterals with the remainder of the surface elements being triangles.

Creation of Polygonal Vertical Lines

In the course of this step, at each node of the surface mesh obtained in the step of "Construction of a surface mesh on the reference surface", a vertical line passing through this node is plotted and the intersections of this line with the mathematical representations of the faults and horizons are calculated. At each node of the surface mesh is defined a polygonal line formed by the set of segments whose ends are the previously calculated points of intersection. The original provenance information (horizon and/or fault) for each of the ends, as well as their order (referred to as a level subsequently) along the polygonal line are preserved in memory.

Figure 5:
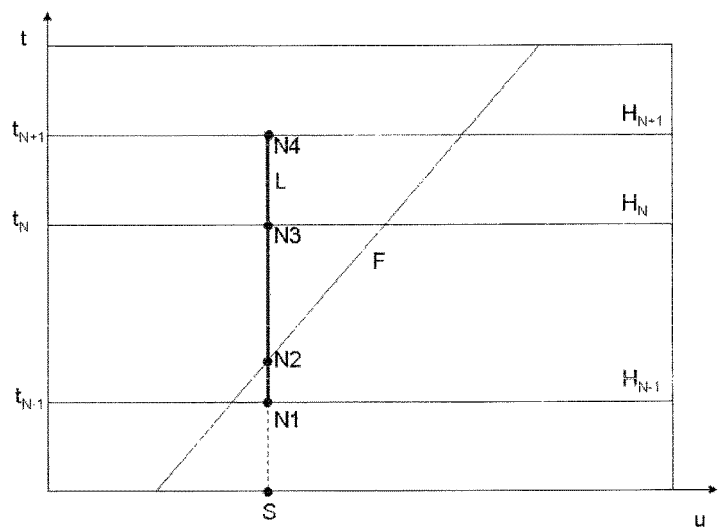
FIG. 5 illustrates the construction of a polygonal line in a medium formed by three horizons and a fault.

FIG. 5 presents an exemplary vertical polygonal line, denoted L, calculated for a medium, represented in two dimensions, comprising three horizons $H_{N-1}$, $H_N$, and $H_{N+1}$ and a fault F, on the basis of a node S of a surface element situated in a reference plane situated at t=0. The polygonal line is formed of three segments along the vertical axis and of four ends (black dots) associated with four levels denoted N1, N2, N3 and N4.

Figures 6A, 6B:
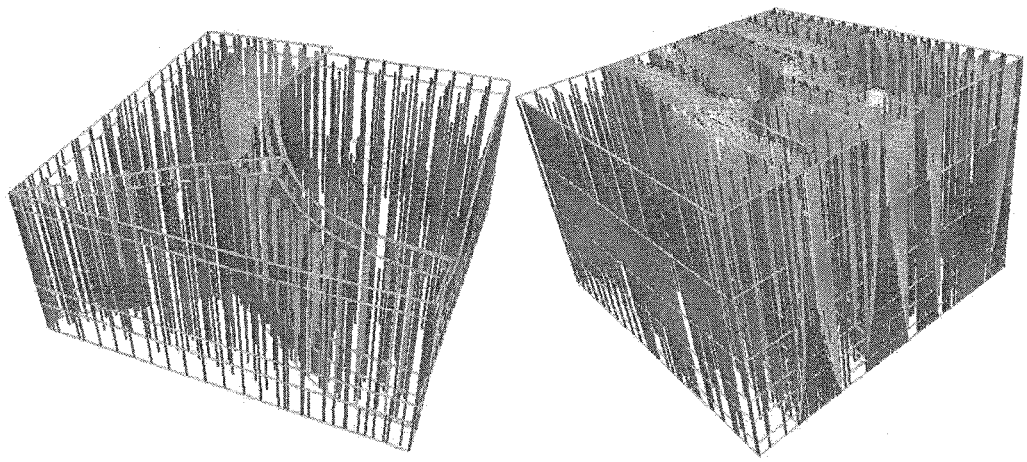
FIGS. 6A and 6B show the polygonal lines obtained for the models Mod1 and Mod2.

The polygonal lines associated with the models Mod1 and Mod2 are presented in dark gray respectively in FIG. 6A and in FIG. 6B.

Creation of Vertical Polygonal Sub-Lines

The step of creating vertical polygonal sub-lines is optional and may be implemented when the representation of at least one fault having two intersecting surfaces.

This occurs for example with the use of the "UVT transformation" of the software SKUA® (PARADIGM®, Israel). The surfaces of the intersecting faults then generate blocks which intermingle. In such a case, the polygonal line initiated from a node of a surface element is cut up into several sub-lines so that each sub-line always belongs to one and the same block.

According to one embodiment of the present invention, the processing of subdivision into polygonal sub-lines uses the arc-wise connectedness of the elements of a block (that is to say the elements of a block can always be linked by a path) as well as at least the following rules:

the upper limit of a polygonal sub-line is either a domain boundary, or the lower side of a fault, or the shallowest horizon (or else the horizon having a maximum value of time t when in the Wheeler parametric space);

the lower limit of a polygonal sub-line is either a domain boundary, or the upper side of a fault, or the deepest horizon (or else having a maximum value of time t when in the Wheeler parametric space).

Note that the polygonal sub-lines of a polygonal line can overlap in the Wheeler parametric space whereas the polygonal sub-lines in the geological space are clearly disjoint.

The polygonal sub-lines associated with the models Mod1 and Mod2 are presented in light gray respectively in FIG. 6A and in FIG. 6B.

Construction of a Volume Mesh by Extrusion of the Surface Mesh

In the course of this step, the volume mesh representative of the geological structure under study in the parametric space before deformation and rupture is generated by vertical extrusion of the surface mesh produced on a reference surface. Extrusion is a technique used in the domain of meshing and of modeling (See for example Frey and George, 2008). According to one embodiment of the present invention, for a given element of the surface mesh, the polygonal lines associated with the nodes of the surface element being considered are traversed simultaneously segment after segment. Next, the ends of each of the segments of each of the polygonal lines are considered and they are grouped together level by level. The ends of one and the same level are thereafter linked by straight segments. One thus obtains a series of consecutive elements, level by level, of the same geometric type (same number of nodes and same number of edges) as the surface element considered. Next, to form volume elements, the consecutive elements thus formed are connected vertically by straight segments. More precisely, a volume element between the levels N and N+1 is formed by the element of the level N, that of the level N+1, the two elements being connected by vertical edges corresponding to the segments between the levels N and N+1 of the polygonal lines associated with the surface element considered. One verifies thereafter, for each volume element thus formed, that all the nodes of the same level belong to one and the same geological object (horizon, fault or domain boundary). If such is the case, then the volume element previously constructed is preserved. If, for a given volume element, the nodes of a given level do not belong to one and the same geological object, then transverse connections, and now not just vertical connections, from one level to another are produced, the consequence of which is to cut the volume element into at least two volume sub-elements.

This procedure will be detailed and illustrated hereinafter in the case of a surface mesh of quad-dominant type.

The operation described hereinabove is repeated for the whole set of elements of the surface mesh. The set of volume elements that is formed constitutes the volume mesh of the formation being studied. The fact that the surface elements are ordered level by level along the vertical axis ensures the matching of the volume mesh.

Indeed, two adjacent volume elements thus always have a common face limited by nodes common to the two elements.

According to a preferred embodiment of the present invention, for which the surface mesh is of quad-dominant type (see the paragraph "Construction of a surface mesh on a reference surface"), two types of extrusion have to be considered which are extrusion of a quadrilateral or extrusion of a triangle.

Figure 7A:
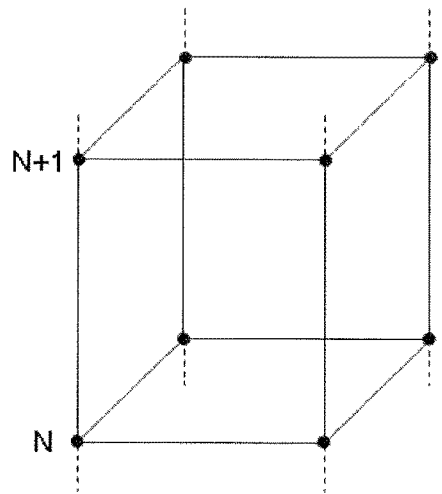
FIGS. 7A and 7B illustrate the possible results of the vertical extrusion of a surface element of a quadrilateral type.
Figure 7B:
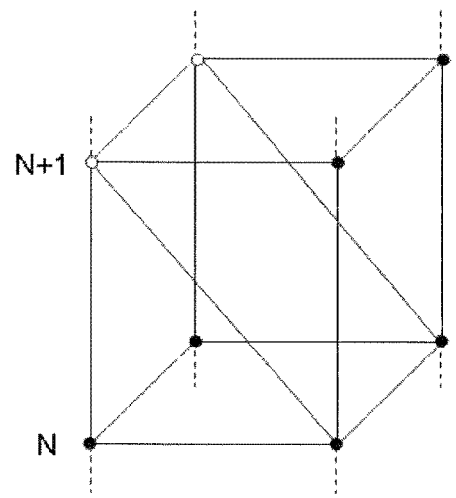

The vertical extrusion of a quadrilateral of the surface mesh results in a series of consecutive quadrilaterals, ordered level by level along the vertical axis. FIG. 7A shows for example the quadrilaterals formed for the levels N and N+1. The consecutive quadrilaterals are connected vertically by the segments of the polygonal lines between the levels N and N+1. If two consecutive quadrilaterals are each formed of four nodes belonging to the same geological object, then the volume element obtained is a hexahedron (FIG. 7A). If a quadrilateral of a given level is formed of two nodes belonging to one and the same geological object (for example the white nodes of level N+1 in FIG. 7B) and of two other nodes belonging to another geological object (for example the black nodes of level N+1 of FIG. 7B), then groups of nodes of the same provenance are formed, and two diagonals are drawn between the levels N and N+1 from one of the two groups of nodes (FIG. 7B). Two inverted prisms (FIG. 7B) are then obtained. One group of nodes rather than the other from which the diagonals are drawn is chosen as a function of the quality of the geometry of the resulting volume elements.

A quality check of the volume elements that have been generated is carried out thereafter. Three conditions are verified for a given volume element:

it must correspond to a hexahedron or to a prism;
its barycenter must be contained in its volume;
its faces must be quasi-plane.

If one of these conditions is not fulfilled, then the quadrilateral of the surface mesh is subdivided into two triangles, along a diagonal. Two extrusions into triangles are thereafter applied as described hereinbelow.

Figure 8A:
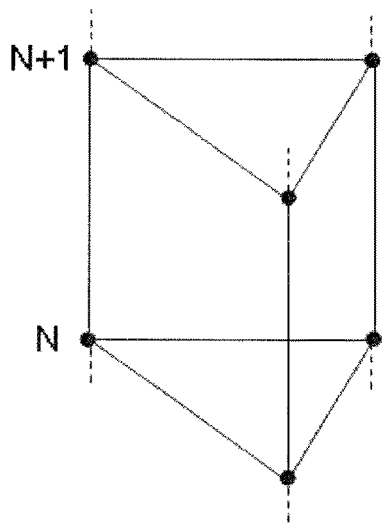
FIGS. 8A and 8B illustrate possible results of the vertical extrusion of a surface element of a triangular type.
Figure 8B:
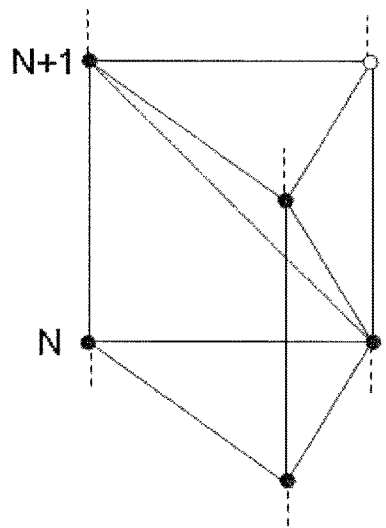

The extrusion of a triangle results in a series of consecutive triangles, ordered level by level along the vertical axis. FIG. 8A shows for example the triangles formed for the levels N and N+1. The consecutive triangles are connected vertically by the segments of the polygonal lines between the levels N and N+1. If two consecutive triangles are each formed of three nodes belonging to the same geological object, then the volume element that is obtained is a prism (FIG. 8A). If a triangle of a given level is formed of two nodes belonging to the same geological object (for example the black nodes of level N+1 in FIG. 8B) and of another node belonging to another geological object (for example the white node of level N+1 of FIG. 8B), then groups of nodes of the same provenance are formed, and two diagonals are drawn between the levels N and N+1 from the group of two nodes (FIG. 8B). A pyramid and a tetrahedron are then obtained (FIG. 8B).

A quality check of the volume elements generated is carried out thereafter. Two conditions are verified for a given volume element:

it must correspond to a prism, a pyramid or to a tetrahedron;

its barycenter must be contained in its volume.

According to one embodiment for which a step of "Matching up of the projections of bounds of blocks onto a reference surface" has been carried out, the nodes of the volume elements originating from surface elements that have undergone matching are reset to their 3D origin position, using the information preserved during this step of matching.

By construction, the volume meshes generated by the present invention in the parametric space before deformation and rupture comply with all of the initial geometric constraints, meaning the geometry of the geological objects (fault, horizon or domain boundary) and the geometry of the intersections of the geological objects (intersection between two faults, between a fault and a horizon, between a fault and a domain boundary, between a horizon and a domain boundary). Moreover, by virtue of the extrusion along the vertical polygonal lines, the elements of the volume mesh contain edges which are orthogonal to the horizons (important property for basin simulation and flow simulation). Also by construction, the meshes obtained by the present invention are valid in the parametric space before deformation and rupture.

According to one embodiment for which the surface mesh produced during the step of "Construction of a Surface Mesh on the Reference Surface" is quad-dominant, the resulting 3D meshes are hexa-dominant after extrusion along the vertical polygonal lines.

Figure 9A:
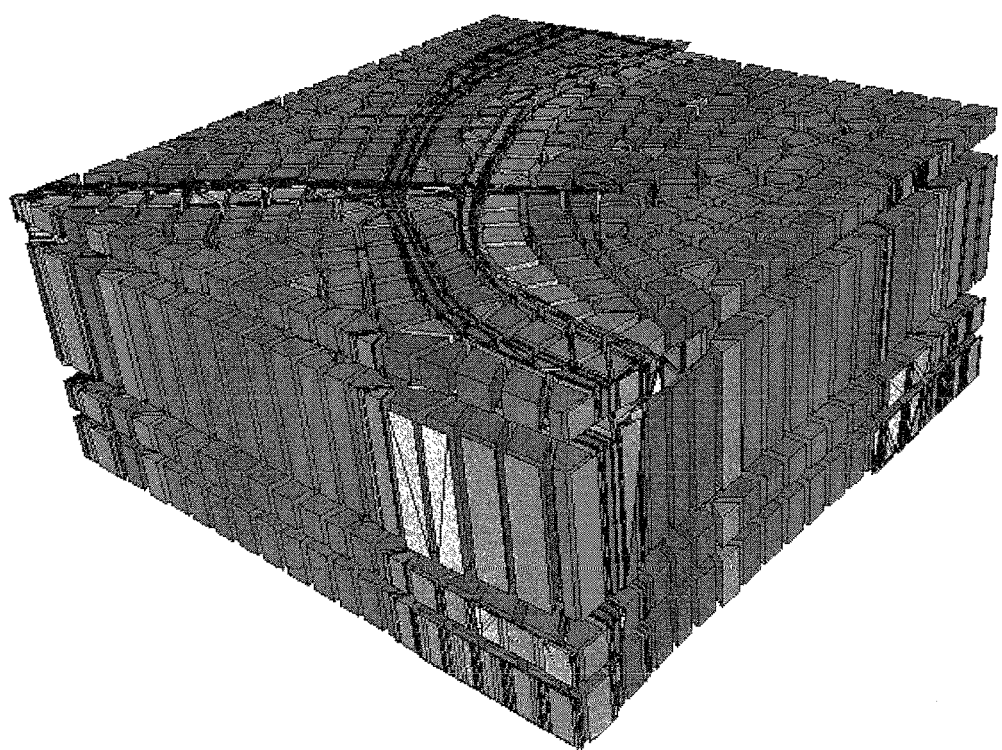
FIGS. 9A and 9B show volume meshes of a hexa-dominant type obtained for the models Mod1 and Mod2 in the Wheeler parametric space.
Figure 9B:
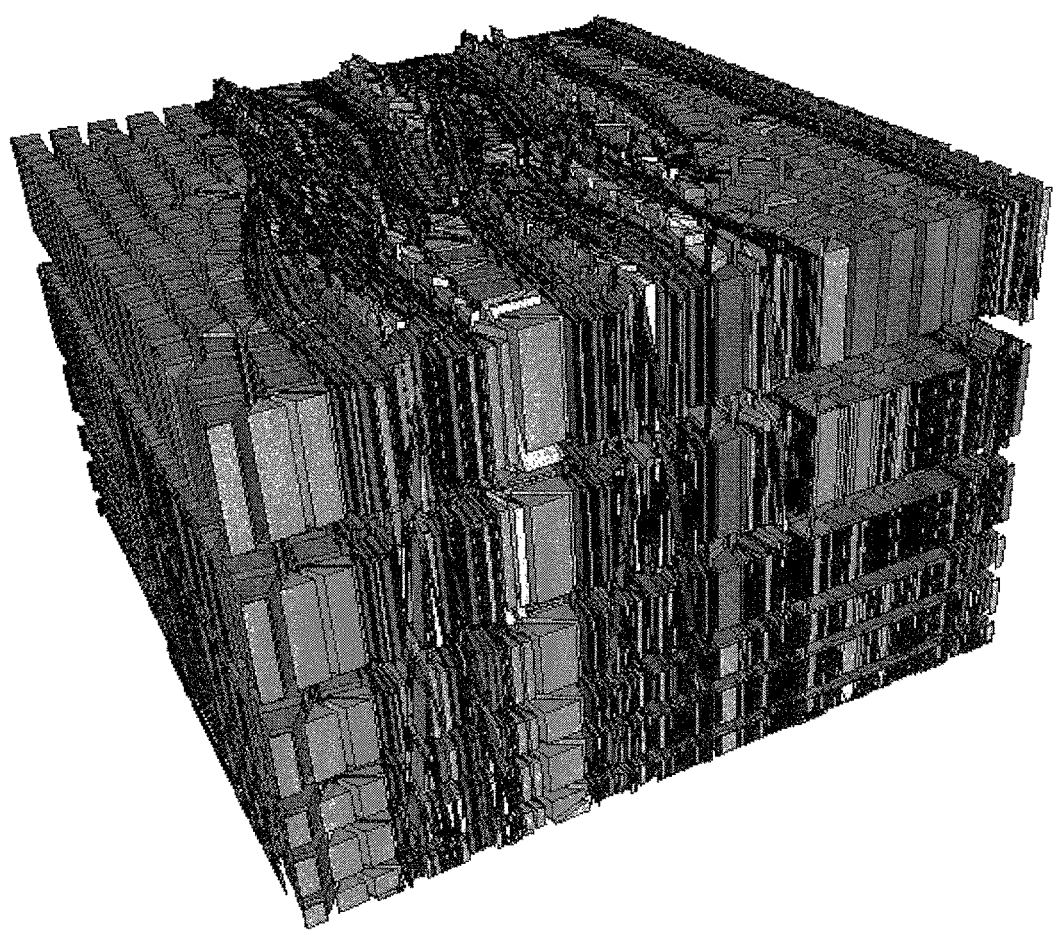

These advantages are in particular illustrated in FIGS. 9A and 9B, showing the volume meshes obtained by the present invention respectively for the models Mod1 and Mod2. The mathematical representations of the horizons and of the faults of these models are given as inputs of the present invention in the Wheeler parametric space and are obtained in the same space. In these figures, the hexahedral mesh cells, distinctly dominant in number, are presented in dark gray with the other gray shades corresponding to mesh cells of prism, of a tetrahedron or else a pyramid type. It may also be observed that the edges of the volume elements are oriented perpendicularly with respect to the horizons. The number and the geometry of the mesh cells at the level of the horizon-fault intersections, in particular in FIG. 9B, illustrates the capacity of the process according to the invention to represent particularly complex zones.

Switching of the Volume Mesh into the Geological Space

According to one embodiment of the invention, for which the volume mesh is constructed in the Wheeler parametric space, it is transposed from the Wheeler parametric space into the geological space by virtue of a "$UVT^{-1}$ transformation". Such a technique is known.

Switching from the Wheeler parametric space to the geological space ensures preservation of the connectivity and of the topology of the volume mesh. The same characteristics are thus conserved after switching into the geological space. Hexa-dominant volume meshes are obtained, complying with all the geometric constraints, with the same property of orthogonality as the edges of the mesh in the vicinity of the horizons (which property is preserved after the "$UVT^{-1}$ transformation" by virtue of the parametrization of the Wheeler parametric space).

Figure 10A:
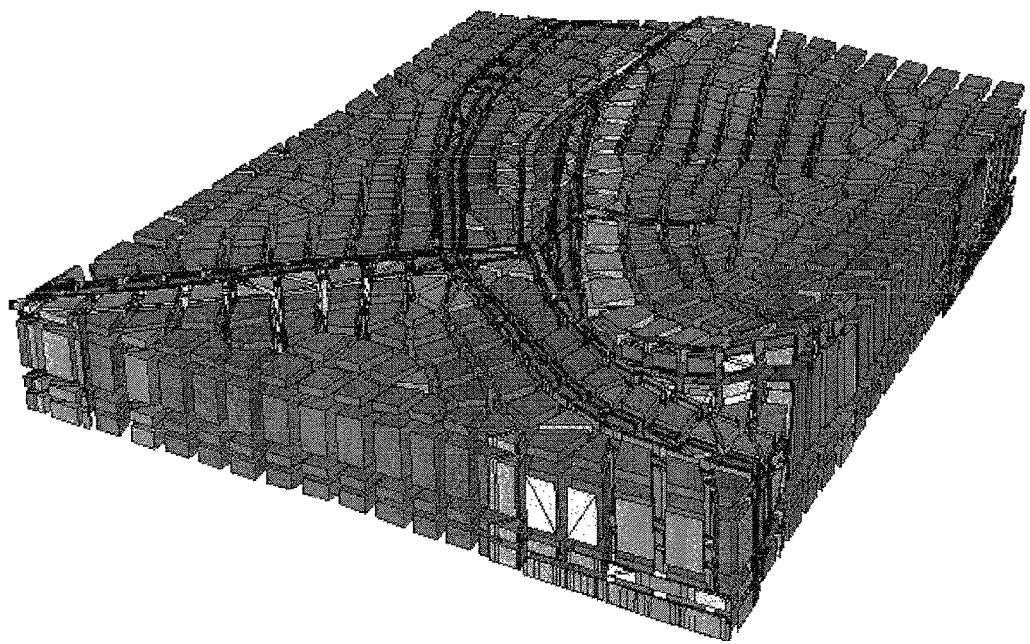
FIGS. 10A and 10B show the volume meshes obtained in the geological space for the models Mod1 and Mod2.
Figure 10B:
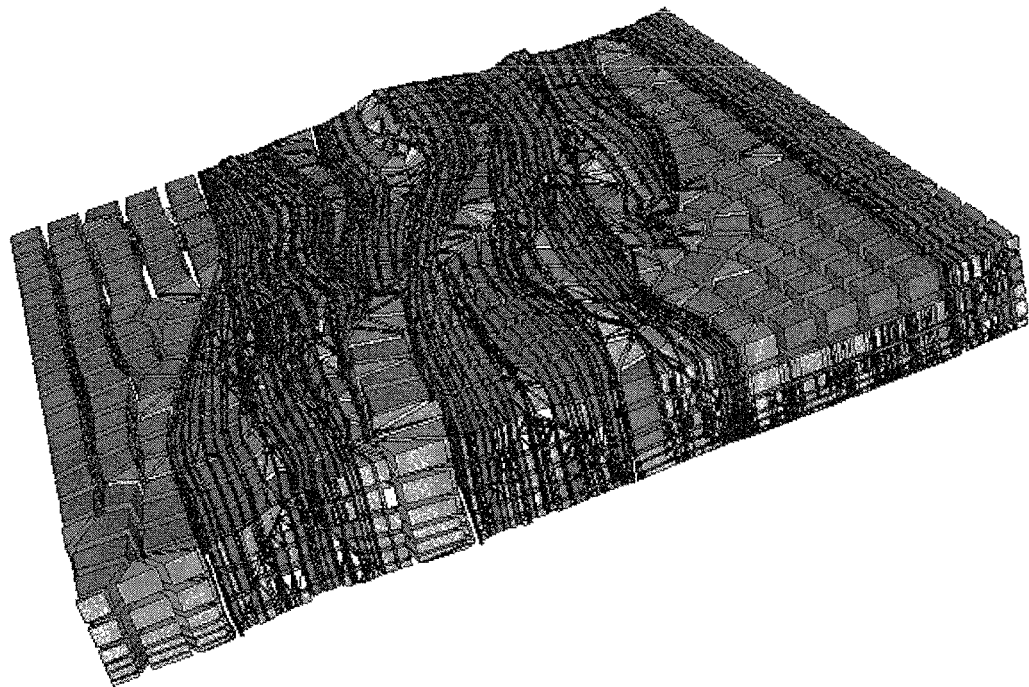

These advantages are illustrated in FIGS. 10A and 10B, showing the volume meshes of the models Mod1 and Mod2 transposed from the Wheeler parametric space into the geological space. It may in particular be noted that these meshes always contain a majority of hexahedral mesh cells (dark gray mesh cells with the other gray shades corresponding to mesh cells of prism, tetrahedron or else pyramid type), for which orthogonality between mesh cells and horizons is still safeguarded, in compliance with the geometric constraints.

Optimization of the Volume Mesh in the Wheeler Parametric Space

According to one embodiment of the invention, for which the volume mesh is constructed in the Wheeler parametric space, recourse may be had to an optional step of optimizing this volume mesh, by an iterative technique of node relocation, to ensure validity of the volume mesh after switching into the geological space via a "$UVT^{-1}$ transformation". To carry out this optimization, it is assumed that, if each element of the volume mesh in the Wheeler parametric space has a volume greater than a predetermined threshold, then the mesh in the geological space, obtained after "$UVT^{-1}$ transformation", is valid.

Next, two categories are defined, pertaining to the nodes of the mesh of the Wheeler parametric space:

A lineal node is a node belonging to a curve corresponding to the bounds of blocks formed by the horizons with the faults and the boundaries of the closed domain;

A surface node is a non-lineal node belonging to a geological object such as a horizon or a fault.

For a surface node belonging to a horizon or to a fault, the faces of the elements sharing the node and which belong to the same geological object are identified. The node is repositioned on the mathematical representation of this geological object so that the areas of the corresponding faces are greater than a predetermined threshold, in conjunction with the volume threshold already specified hereinabove.

This same procedure is applied to the lineal nodes. In this case, the repositioning is done on the corresponding curve.

This procedure is applied in an iterative manner to all the elements of the volume mesh whose volume is smaller than the specified volume threshold.

Exploitation of the Reservoir

Furthermore, the invention relates to a process for exploiting a subsurface formation, in which the following steps are carried out:

A volume mesh representative of a formation studied is constructed using the process as described hereinabove;

A basin simulation and/or a reservoir simulation is carried out based on the volume mesh;

An optimal scheme for exploiting the reservoir is determined based on the results of the basin simulation and/or of the reservoir simulation; and The reservoir is exploited by implementing the optimal exploitation scheme.

Based on a basin simulation and/or a reservoir simulation carried out on the volume mesh obtained during the previous steps, several exploitation schemes can be determined corresponding to various possible configurations of exploitation of the subsurface reservoir such as location of the producer wells and/or injector wells, target values for the flowrates per well and/or for the reservoir, the type of tools used, the fluids used, and fluids injected and/or recovered, etc. For each of these schemes, it is appropriate to determine the production forecasts. These probabilistic production forecasts can be obtained by use of flow simulation software as well as by use of a tailored numerical reservoir model.

A reservoir simulation is a technique which simulates flows of fluids within a reservoir by use of software called a flow simulator. For example, the software PumaFlow® (IFP Energies nouvelles, France) is a flow simulator.

One or more possible exploitation schemes suited to the geological model being studied is or are defined. For each of these schemes, the responses are determined by simulation.

Based on the probabilistic production forecasts defined for each exploitation scheme, a comparison of forecasts is made of the exploitation schemes is made to determine which scheme is the most relevant. For example:
- by comparing the maximum of the volume of oil recovered, it is possible to determine the production scheme likely to provide maximum recovery or to be the most profitable; and
- by comparing the standard deviation of the volume of oil recovered, it is possible to determine the least risky production scheme.

The reservoir is then exploited according to the exploitation scheme defined for example by drilling new wells (producer or injector), by modifying the tools used, by modifying the flowrates and/or the nature of injected fluids, etc.

The invention relates, moreover, to a computer program product downloadable from a communication network and/or recorded on a support readable by computer and/or which is executed non transiently by a processor. This program comprises program code instructions for the implementation of the process such as described hereinabove, when the program is executed on a computer.

The invention claimed is:

1. A process for exploiting a subsurface formation to produce hydrocarbons comprising at least one sedimentary layer in at least one of a basin and a reservoir, the at least one sedimentary layer being limited vertically by two geological horizons and traversed by at least one fault, the at least one fault being based on a mathematical representation in a closed geometric domain of horizons and on the at least one fault in a Wheeler parametric space before deformation and rupture, wherein the Wheeler parametric space is a 3D parametric space in which any point has spatial coordinates and a time coordinate and with time being geological time comprising:

a) determining curves by computing intersections between the mathematical representations of the horizons and of the at least one fault taken pairwise and between each of the mathematical representations of the horizons and boundaries of the closed domain, and vertically projecting the determined curves onto a reference surface;

b) constructing a surface mesh including nodes and which is constrained by projection of the curves onto the reference surface;

c) defining at each node of the surface mesh a vertical polygonal line of the node including at least one vertical segment delimited by intersections of the vertical line passing through the node, the representations of the horizons or the at least one fault;

d) constructing a volume mesh by providing a vertical extension of the surface mesh along each vertical line;

e) simulating at least one of the basin and the reservoir based on the volume mesh;

f) determining a scheme for exploiting at least one of the basin and the reservoir based on at least one of the simulating the basin and simulating the reservoir and production forecasts from the reservoir; and g) exploiting the reservoir with the determined scheme by drilling at least one of a production well and an injector well to facilitate as part of production producing hydrocarbons from the reservoir.

2. A process according to claim 1, wherein the reference surface is a horizontal plane in the Wheeler parametric space.

3. A process according to claim 1, wherein the reference surface is a surface situated at ordinate $t=0$ in the Wheeler parametric space with t being time.

4. A process according to claim 1, wherein the volume mesh is transposed into a geological space by a transformation method relating the Wheeler parametric space and the geological space.

5. A process according to claim 3, wherein the volume mesh is transposed into a geological space via a transformation method relating the Wheeler parametric space and the geological space of the at least one sedimentary layer.

6. A process according to claim 1, comprising: relocating nodes in the volume mesh.

7. A process according to claim 1, wherein the surface mesh is a quad dominate mesh.

8. A process according to claim 1, wherein the surface mesh is obtained by generating a triangular mesh constrained by the projections onto the reference surface and pairing adjacent triangles to form quadrilaterals.

9. A process according to claim 8, comprising using an advancing front method to provide the triangular mesh.

10. A process according to claim 1, wherein the vertical lines include at least one vertical segment limited by an intersection of a vertical line passing through one of the nodes with representations of horizons or the at least one fault.

11. A process according to claim 1 comprising:
extruding vertically a surface element by simultaneously traversing vertical lines associated with the surface element, laterally linking ends of the vertical lines of a level and linking ends of the vertical lines at consecutive vertical levels to form volume elements, and for each volume element, if some nodes of one level do not belong to one fault or to a one fault on a same horizon, cutting each volume element according to at least one transverse plane passing through two consecutive levels.

12. A process according to claim 1, comprising between steps a) and b):
matching curves and points resulting from projection of boundaries by merging at least one of the curves and the points which have a spacing less than a predetermined threshold or addition of points at a level of intersections between curves.

* * * * *